(12) United States Patent      (10) Patent No.: US 8,724,099 B2
Asahara et al.      (45) Date of Patent: May 13, 2014

(54) AIRBORNE LIDAR FOR DETECTING MATTER SUSPENDED IN AIR

(75) Inventors: Takashi Asahara, Tokyo (JP); Hamaki Inokuchi, Tokyo (JP); Kazuhiro Asai, Miyagi (JP)

(73) Assignee: Japan Aerospace Exploration Agency, Tokyo (JP)

( * ) Notice: Subject to any disclaimer, the term of this patent is extended or adjusted under 35 U.S.C. 154(b) by 165 days.

(21) Appl. No.: 13/343,152

(22) Filed: Jan. 4, 2012

(65) Prior Publication Data

US 2012/0182544 A1     Jul. 19, 2012

(30) Foreign Application Priority Data

Jan. 14, 2011    (JP) ................................. 2011-5722

(51) Int. Cl.
*G01J 3/18*      (2006.01)
*G01J 4/00*      (2006.01)

(52) U.S. Cl.
USPC .......................................... 356/73; 356/370

(58) Field of Classification Search
USPC ................... 356/364–370, 445–448
See application file for complete search history.

(56) References Cited

U.S. PATENT DOCUMENTS

| | | | |
|---|---|---|---|
| 4,589,070 A * | 5/1986 | Kyrazis | 701/14 |
| 5,914,776 A * | 6/1999 | Streicher | 356/5.01 |
| 6,751,532 B2 | 6/2004 | Inokuchi | |
| 7,508,520 B1 * | 3/2009 | Lines et al. | 356/437 |
| 8,054,464 B2 * | 11/2011 | Mathur et al. | 356/342 |
| 2011/0122397 A1 * | 5/2011 | Wong | 356/51 |
| 2011/0188029 A1 * | 8/2011 | Schmitt et al. | 356/28 |

FOREIGN PATENT DOCUMENTS

| | | |
|---|---|---|
| JP | 2003-014845 A | 1/2003 |
| JP | 2010-217077 A | 9/2010 |

OTHER PUBLICATIONS

Wei-Nai Chen, Lidar ratio and depolarization ratio for cirrus clouds, Oct. 20, 2002 Applied Optics, vol. 41.*
Inokuchi, Hamaki et al., "Development of an Onboard Doppler LIDAR for Flight Safety", Journal of Aircraft, Jul.-Aug. 2009, pp. 1411-1415, vol. 46.
Chinese Office Action dated Dec. 7, 2011, issued in corresponding Chinese Patent Application No. 200880010034.1.

* cited by examiner

*Primary Examiner* — Gregory J Toatley
*Assistant Examiner* — Maurice Smith
(74) *Attorney, Agent, or Firm* — Westerman, Hattori, Daniels & Adrian, LLP

(57) ABSTRACT

An object of the present invention is to provide a device which detects matter suspended in air, represented by, for example, ice crystals, volcanic ash, in the forward direction of the flight of an aircraft. A method of detecting matter suspended in air of this invention is characterized in that, in airborne Doppler LIDAR using laser light, components of matter subjected to laser light reflection and scattering are remotely measured on a basis of an angular difference in planes of polarization of transmitted light which is laser light radiated into the atmosphere, and received light scattered by matter suspended in air in a remote region.

6 Claims, 3 Drawing Sheets

AIRBORNE LIDAR FOR DETECTING MATTER SUSPENDED IN AIR

BACKGROUND OF THE INVENTION

1. Field of the Invention

This invention relates to LIDAR technology for detecting matter suspended in air, utilized by an aircraft to measure components of matter suspended in air in distant regions ranging from several hundred meters to approximately several tens of kilometers based on the depolarization ratio of laser light, when laser light is irradiated into the atmosphere and the scattered light resulting from scattering of the laser light in the atmosphere is received.

2. Description of the Related Art

Air turbulence is representative of threats to the flight of aircraft posed by meteorological phenomena, but in addition to this there are such dangerous atmospheric states as ice crystals and volcanic ash, and insofar as such phenomena cannot be detected using weather radar, they remain obstacles to flight. The inventors have been engaged in research and development of Doppler LIDAR using laser light as a means of preventing accidents due to air turbulence. (See for example Japanese Patent Application Laid-open No. 2003-14845, "Wind disturbance prediction system", published on Jan. 15, 2003, and H. Inokuchi, H. Tanaka and T. Ando, "Development of an Onboard Doppler LIDAR for Flight Safety", AIAA Journal of Aircraft, Vol. 46, No. 4, July-August, 2009.) LIDAR is an acronym for Light Detection and Ranging, which is a detection method using light. Irradiated light rays are scattered by minute aerosols suspended in air, and by receiving this scattered light and measuring the change in frequency (the amount of wavelength change) due to the Doppler effect, the wind velocity is measured; hence this method is called Doppler LIDAR. Using Doppler LIDAR, it is possible to measure the spatial distribution of aerosols, but aerosol components cannot be measured, and so it is not possible to distinguish between components such as water droplets that are not dangerous to the flight of an aircraft, and components such as ice crystals and volcanic ash that are very dangerous. Further, weather radar which has already been utilized in aircraft-mounted mode uses microwaves with wavelengths of several centimeters, and so are not effective for detecting such minute particles as ice crystals and volcanic ash. Observation of the upper atmosphere from ground facilities, and observation from artificial satellites, are possible; but covering the area of an entire flight is not realistic from the standpoint of cost-effectiveness. Japanese Patent Application Laid-open No. 2010-217077, "Alarm display method of remote air flow, and system for the same", published on Sep. 30, 2010, presents a method for estimating regions in which matter suspended in air exist, but does not include a method for determining the components thereof.

One example in which ice crystals were inferred to be the cause of an aircraft accident is American Eagle Flight 4184, on Oct. 31, 1994. In this accident, the crash of the aircraft was inferred to be due to loss of control of the airframe as a result of ice crystals which were encountered and which adhered to the main wings. Moreover, All Nippon Airways Flight 173 on May 21, 2001, and Japan Airlines Flight 2408 on Sep. 23, 2004, are thought to be accidents due to air turbulence, but if ice crystals in the upper portion of a cumulonimbus cloud had been detected in advance, there was the possibility that air turbulence could have been predicted. In addition, there exist numerous examples in which it is suspected that ice crystals may be related to crash accidents with unknown causes.

In addition to ice crystals, volcanic ash is also extremely dangerous as suspended matter which is a threat to aircraft. It is thought that during British Airways Flight 9 on Jun. 24, 1982, volcanic ash was melted by the heat of the jet engines and adhered to the inside, so that all engines stopped. This was the first instance in which the four engines of a four-engine jet, which is held to be very safe, had all stopped. Thereafter, all engines stopped on Royal Dutch Airlines Flight 867 on Dec. 15, 1989 as well, and in order to prevent a reoccurrence, volcanic ash information centers (Volcanic Ash Advisory Center, International Airways Volcano Watch, and similar) were established in nine places around the world. However, the function of such centers is to monitor volcanic ash, predict dispersion of volcanic ash, and provide a broad range of other information, but not to provide detailed information for individual aircraft. When an engine sucks in volcanic ash, even when an accident does not result, expensive repair costs are incurred, and considerable damage has occurred in Japan as well due to the volcanic fumes from Sakurajima and Miyakejima. In April 2010, a volcano in the south of Iceland erupted, and large amounts of volcanic ash were spewed upward; at high altitudes where the atmosphere is stable, there is the possibility that volcanic ash may remain at a specific height for a long period of time. Because in this case the dangerous region of airspace could not be determined precisely, it was necessary to completely halt flights over Europe as a whole, causing massive economic losses worldwide.

Although lightning strikes of aircraft, which occur regularly, will never result in a major accident, damage to flight equipment frequently occurs. Lightning strikes of aircraft are caused by excessive accumulation of static electricity on the airframe due to collisions with ice crystals, volcanic ash and the like, and so advance detection of ice crystals and volcanic ash can be expected to have an effect in preventing lightning strikes.

SUMMARY OF THE INVENTION

An object and goal of this invention is to resolve the above problems, that is, to provide a device which detects suspended matter in the air in the forward direction of the flight of an aircraft, of which ice crystals, volcanic ash and similar are representative.

A method of detecting matter suspended in air of this invention is characterized in that in airborne Doppler LIDAR using laser light, components of matter subjected to laser light reflection and scattering are remotely measured on a basis of an angular difference in the polarization plane of transmitted light which is laser light radiated into the atmosphere, and received light which has been scattered by matter suspended in air in a remote region.

The angular difference in the polarization plane is expressed by the following equation, where $\delta$ is the depolarization ratio of received light which is an index indicating proportion of change of a polarization state of received light to that of transmitted light due to scattering by matter suspended in air, when laser light having a unidirectional polarization plane (in the X-axis direction) is used as the transmitted light radiated into the atmosphere.

$$\delta = |Ry|/|Rx|$$

Here $|Rx|$ is the intensity of the polarization component in the X-axis direction (parallel to the polarization direction of the transmitted light) of the received light R which has been scattered by matter suspended in air and returned to the transmission source, and $|Ry|$ is the intensity of the polarization component in the Y-axis direction (perpendicular to the polarization direction of the transmitted light) of the received light R.

Further, in a method of detecting matter suspended in air of this invention, the suspension region of matter suspended in air is estimated from the distant attenuation characteristics of the reception intensity of received light, and components of matter reflecting laser light are remotely measured for the estimated suspension region.

A LIDAR device for detection of matter suspended in air of this invention comprises an optical telescope, which radiates (transmits) laser light into the atmosphere as transmitted light and which receives scattered laser light due to scattering of the laser light by aerosols in the atmosphere as received light; means for measuring depolarization ratio between the transmitted light and the received light; and means for detecting matter suspended in air, which detects the components of matter suspended in air including ice crystals and volcanic ash on a basis of proportion of change in measured polarization states.

In one aspect of a LIDAR device for detection of matter suspended in air of this invention, Doppler LIDAR means is further provided for measurement of the velocity of an air current in a remote region based on the Doppler shift between the transmitted light and the received light.

LIDAR for detection of matter suspended in air of this invention measures components of matter which cause reflection of laser light from the depolarization ratio between transmitted light and reflected light, and thus can detect in advance whether matter which may have adverse effects exists in the forward direction of an aircraft. That is, by using LIDAR for detection of matter suspended in air of this invention during flight, a pilot can identify in advance the atmospheric conditions in the forward direction of flight, and so can take appropriate measures to avoid danger. Or, LIDAR for detection of matter suspended in air of this invention can be mounted on a dedicated observation aircraft, to survey dangerous airspace in detail.

Further, at high altitudes such as those at which passenger jets cruise, the air is generally stable, and so suspended matter is often spread out in layer form at fixed altitudes. Hence rather than avoiding detected dangerous matter by means of a steep turn, it is more realistic to either not fly at a particularly dangerous altitude, or to pass through a dangerous altitude in a short time. When avoidance is not possible, by integrating the amount of volcanic ash sucked in, it is possible to utilize the result to shorten the period between engine inspections or to make other similar decisions. Hence LIDAR for detection of matter suspended in air of this invention can be expected to effectively prevent aircraft accidents and damage to flight equipment.

DESCRIPTION OF THE PREFERRED EMBODIMENTS

Below, embodiments shown in the figures are used to explain the invention in detail. However, the invention is not limited to the embodiments.

Figure 1:
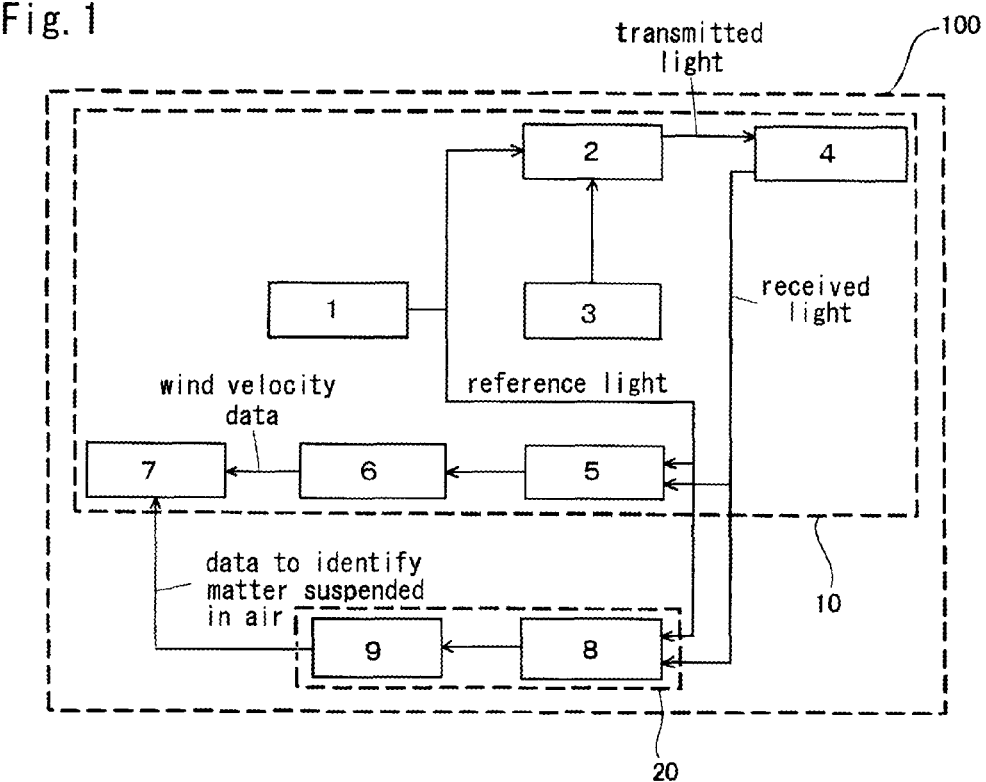
FIG. 1 is an explanatory diagram of the configuration of LIDAR for detection of matter suspended in air of this invention.

FIG. 1 is an explanatory diagram of the configuration of LIDAR for detection of matter suspended in air of this invention. This LIDAR for detection of matter suspended in air 100 comprises a Doppler LIDAR unit 10 which radiates (transmits) laser light into the atmosphere as transmitted light, receives the scattered laser light resulting from scattering of the laser light by aerosols in the atmosphere as received light, and based on the Doppler shift between the transmitted light and the received light, measures the wind velocity of the airstream in a remote region; and a unit to detect matter suspended in air 20 which measures depolarization ratio between the transmitted light and received light, and from the proportion of the change in the measured polarization state, detects components of matter suspended in air such as ice crystals and volcanic ash.

The Doppler LIDAR unit 10 comprises a reference light source 1 which generates weak laser light (reference light) as transmitted light; an optical amplifier 2 which amplifies the weak laser light for use as transmitted light; an excitation light source 3 which generates laser light as pumping light to excite the optical amplifier 2; an optical telescope 4, which radiates the transmitted light to a great distance and which concentrates scattered light from a great distance; a light receiver 5, which receives the scattered laser light, combines this with the reference light, and outputs a beat signal; a signal processor 6, which processes the beat signal and measures the wind velocity of an air current in the forward direction of the airframe; and a display 7, which displays the wind velocity measurement result and the results of identification of suspended matter, described below. As the transmitted light, for example infrared laser light in the 1.5 μm wavelength band, which is not readily affected by meteorological conditions and is safe for the human retina may be used, and as the excitation light source a high-efficiency laser diode may be used.

The unit to detect suspended matter in air 20 comprises a depolarization ratio measurement instrument 8, which measures depolarization ratio between the received light and transmitted light, and an instrument to identify matter suspended in air 9, which identifies components of matter suspended in air such as ice crystals and volcanic ash from the measured depolarization ratio, and outputs the results of identification of suspended matter.

Next, details of the principle of measurement in which components of matter suspended in air are detected are explained. The laser light has the property of polarization, in which electromagnetic waves oscillate in specific directions, and the polarization state changes according to the shape of suspended matter when the light is affected by scattering by the matter suspended in air. For example, when there is scattering by suspended matter having a spherical shape, or having a surface which is sufficiently smooth compared with the wavelength of the laser light, the polarization state does not change much, but when there is scattering by suspended matter having an non-spherical shape, or the surface of which has complex depressions or protrusions of the order of the wavelength of the laser light, as when there is a crystal structure or as in the case of volcanic ash, the polarization state changes substantially. That is, because the polarization state changes according to the shape of the suspended matter, by measuring the proportion of the change in polarization state (depolarization ratio) due to the scattering bodies, the component of suspended matter of different shape can be identified.

Figure 2:
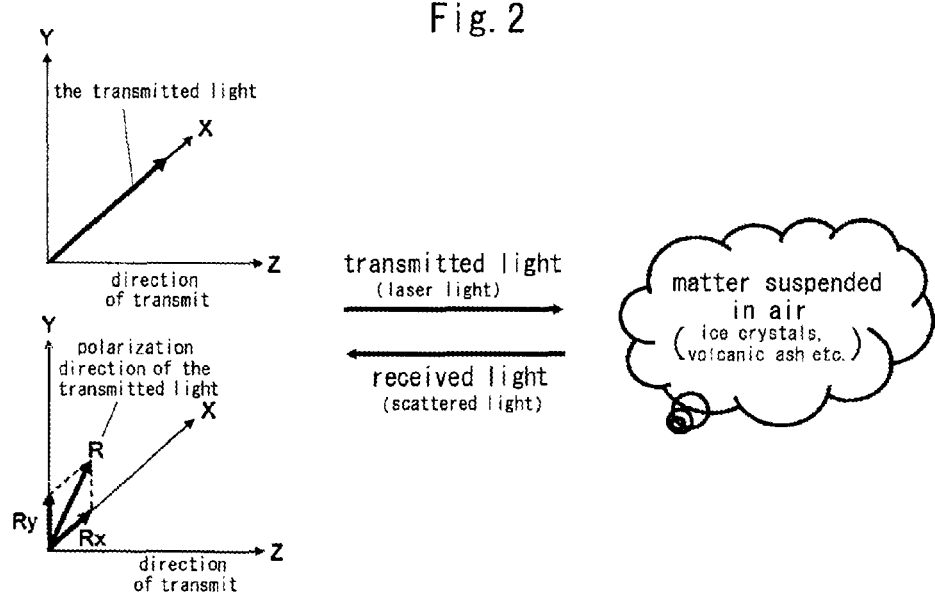
FIG. 2 explains the principle of detecting matter suspended in air of this invention.

In the depolarization ratio measurement instrument 8, as for example shown in FIG. 2, when laser light polarized in a single certain direction (in this case, the direction of the X axis), is irradiated into the atmosphere as the transmitted light, laser light scattered by ice crystals, volcanic ash and other matter suspended in air is received as received light, and the depolarization ratio between the transmitted light and the received light is measured. The depolarization ratio $\delta$ is an index indicating the proportion of the change in polarization state of the received light with respect to the transmitted light due to scattering by matter suspended in air, and is for example expressed as follows.

$$\delta = |Ry|/|Rx| \quad (1)$$

Here $|Rx|$ is the intensity of the polarization component in the X-axis direction (parallel to the polarization direction of the transmitted light) of the received light R which has been scattered by matter suspended in air and returned to the transmission source, and $|Ry|$ is the intensity of the polarization component in the Y-axis direction (perpendicular to the polarization direction of the transmitted light) of the received light R.

Figure 3:
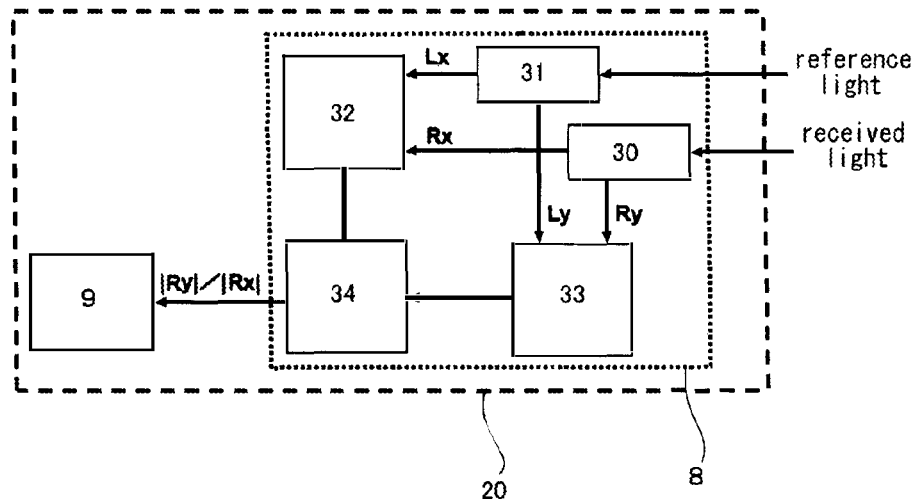
FIG. 3 is an explanatory diagram of the configuration of a depolarization ratio measurement instrument of this invention.

FIG. 3 is an example of the configuration of a depolarization ratio measurement instrument 8. 30 is received light separation means, 31 is reference light separation means, 32 is a first optical receiver, 33 is a second optical receiver, and 34 is a first signal processor.

Operation of the depolarization ratio measurement instrument 8 is explained based on the figure. The received light separation means 30 separates the received light into a polarization component in the X direction (Rx) and a polarization component in the Y direction (Ry). The reference light separation means 31 generates reference light Lx linearly polarized in the X direction and reference light Ly linearly polarized in the Y direction from the reference light of the reference light source. The first optical receiver performs coherent detection of the polarization component in the X direction (Rx) of the received light and the reference light Lx which is linearly polarized in the X direction. The second optical receiver similarly performs coherent detection of the polarization component in the Y direction (Ry) of the received light and the reference light Ly which is linearly polarized in the Y direction. In the first signal processor 34, the intensity $|Rx|$ of the polarization component in the X direction (Rx) of the received light is determined from the reception signal of the first optical receiver, and the intensity $|Ry|$ of the polarization component in the Y direction (Ry) of the received light is determined from the reception signal of the second optical receiver, and by taking the ratio of the two, the depolarization ratio ($\delta = |Ry|/|Rx|$) can be obtained.

The instrument to identify matter suspended in air 9 identifies components of matter suspended in air, such as ice crystals and volcanic ash, from the depolarization ratio measured by the depolarization ratio measurement instrument 8. For example, the interrelation between depolarization ratio $\delta$ and components of matter suspended in air are measured in advance by actual measurements or similar, a correspondence table such as that shown in Table 1 is created, and this correspondence table is used to identify components of matter suspended in air from the value of the depolarization ratio $\delta$.

TABLE 1

| Depolarization ratio $\delta$ | Identification result |
|---|---|
| $a1 \leq \delta \leq a2$ | Matter A suspended in air |
| $b1 \leq \delta \leq b2$ | Matter B suspended in air |
| $c1 \leq \delta \leq c2$ | Matter C suspended in air |
| ... | ... |

On the other hand, Doppler LIDAR uses the fact that aerosols move together with air currents, and measures wind velocity by detecting the flow of air through observation of received light scattered by these aerosols. That is, the wavelength of received light is changed from that of the transmitted light due to the Doppler shift according to movement of aerosols, so that a wavelength shift occurs between the transmitted light (reference light) and received light, and by performing signal processing of the beat signal due to this wavelength shift in the device, the wind velocity is determined.

Thus the present invention is configured with a function to detect the components of matter suspended in air added to Doppler LIDAR, and by means of this configuration, because such devices as an optical amplifier and optical telescope can be shared, in addition to detection of air turbulence which has an adverse effect on aircraft, a function to detect components of matter suspended in air such as ice crystals and volcanic ash can be added while suppressing increases in cost and similar. Further, when Doppler LIDAR is used to detect air turbulence, it is necessary to observe scattered light from aerosols suspended in a high-altitude region at altitudes of 10 km and higher and in a remote region extending a maximum of several tens of kilometers, and the output of the transmitted light is increased so as to detect the wind velocity accompanying air turbulence with good precision. On the other hand, when detecting components of matter suspended in air such as ice crystals and volcanic ash which may endanger the flight of an aircraft, if the suspension density of the ice crystals, volcanic ash or other matter suspended in air is assumed to be sufficiently high compared with the suspension density of aerosols observed at the time of measurement of air turbulence, and high-output transmitted light is used in Doppler LIDAR to observe the matter suspended in air, there is the advantageous result that the effective range is long compared with detection of air turbulence and the detection performance is also improved. In the case of a uniform atmospheric state, LIDAR reception intensity falls in substantially inverse proportion to the square of the measurement distance, but in a region in which the reception intensity of scattered light does not fall with increasing measurement distance, because light is scattered with high intensity, the frontal part of a region in which clouds, ice crystals, or volcanic ash is suspended can be estimated. That is, by combining information on the reception intensity with information obtained from depolarization ratio, it may be possible to further enhance detection performance for components of matter suspended in air.

In this way, by mounting a device of this invention on an aircraft, it is possible to detect in advance not only air turbulence which may endanger the flight of the aircraft, but components of ice crystals, volcanic ash, and other matter suspended in air, greatly contributing to the flight safety of the aircraft.

A configuration in which Doppler LIDAR has been added has been described; but a configuration may be used in which, with Doppler LIDAR not being required, only a function for detecting components of matter suspended in air is provided. Further, a coherent detection method was assumed as the reception method, but a direct detection method may be used. Similarly, infrared-region laser light was assumed, but laser light in the visible region or in the ultraviolet region can be used in implementation.

Example 1

Figure 4:
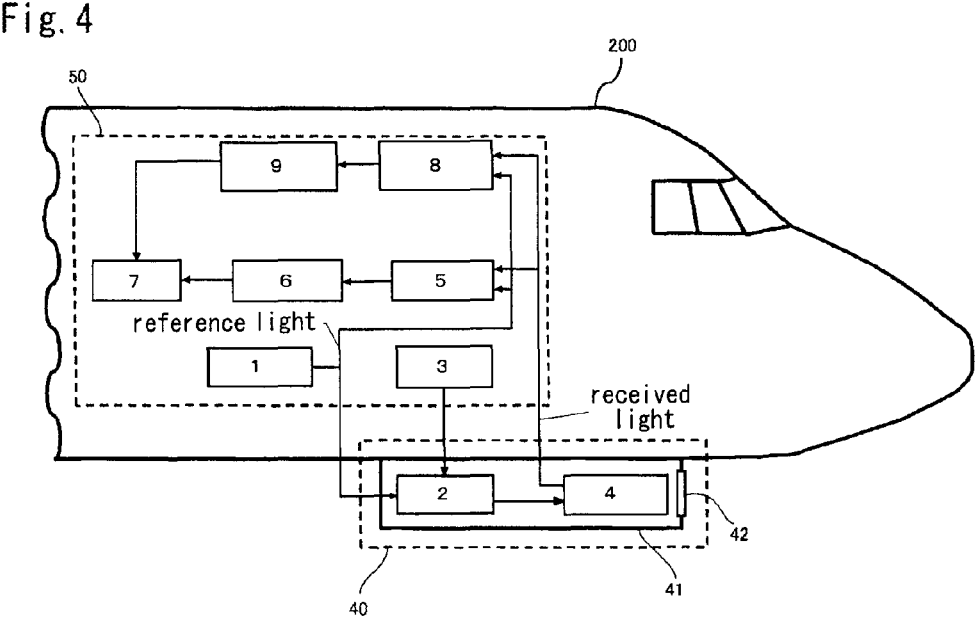
FIG. 4 is an explanatory diagram of the configuration of the LIDAR for detection of matter suspended in air of Example 1 of the invention.

FIG. 4 shows a state in which LIDAR for detection of matter suspended in air of this invention is mounted on an aircraft. In the figure, an optical telescope and an optical amplifier are mounted on the lower face of the airframe, and devices outside the airframe are covered by a fairing 41 for the purpose of reducing air friction and the like. A window 42 is installed in the direction in which laser light is transmitted, so that laser light can be transmitted and scattered light can be received. In this example, a configuration is employed in which the optical telescope and optical amplifier are mounted on the lower face of the airframe, but other configurations are possible, and mounting on side faces of the nose, on lower faces of the wings, and similar are conceivable; equipment can be mounted on individual aircraft at locations where mounting is easy. Equipment other than that described above is mounted within the aircraft.

In identification of the components of matter suspended in air, laser light polarized in one certain direction is irradiated into the atmosphere as the transmitted light, and laser light scattered by ice crystals, volcanic ash or other matter suspended in air is received as the received light; the depolarization ratio between this transmitted light and received light is measured, and from the depolarization ratio, components of the matter suspended in air are identified. In particular, when mounted on an aircraft, it is sufficient to be able to identify ice crystals and volcanic ash, which are threats to flight, and water droplets and similar which are not dangerous, and so the correspondence relation between the depolarization ratio and components of matter suspended in air may be determined in advance, as shown in Table 2, and this may be used to identify components of matter suspended in air.

TABLE 2

| Depolarization ratio δ | Identification result |
| --- | --- |
| X1 ≤ δ ≤ X2 | Ice crystals |
| Y1 ≤ δ ≤ Y2 | Volcanic ash |
| Other than the above | Other (water droplets, or other non-dangerous matter) |

For example, as a specific example, when laser light in the visible region (green laser light of wavelength 532 nm) is used as the transmitted light, the correspondence relation between depolarization ratio and components of matter suspended in air is as shown in Table 3.

TABLE 3

| Depolarization ratio δ | Identification result |
| --- | --- |
| 0.3 ≤ δ ≤ 0.5 | Ice crystals |
| 0.1 ≤ δ ≤ 0.2 | Volcanic ash |
| Other than the above | Other (water droplets, or other non-dangerous matter) |

Even when laser light in the infrared region (wavelength 1550 nm) is used, if transmission wavelengths at the second harmonic (wavelength 775 nm) and third harmonic (wavelength 516 nm) are used, the above correspondence relations can be used without modification. Even when using laser light at other, different wavelengths, similar correspondence relations can be acquired in advance through actual measurements.

A configuration is employed in which a function for detecting components of matter suspended in air is added to Doppler LIDAR. In Doppler LIDAR, in order to observe aerosols suspended over a remote region extending for several tens of kilometers and in high-altitude regions at altitudes of 10 km and higher, the transmitted light output is made large. In this device, high-output transmitted light is used to detect components of ice crystals, volcanic ash and other matter suspended in air, and therefore the effective range of detecting components of matter suspended in air is long compared with detection of air turbulence, and the detection precision is also enhanced. Through such measurements, a pilot can be informed, via a display or similar, of air conditions in the forward direction of flight, and the pilot can take appropriate measures to avoid dangers during flight of the aircraft.

Example 2

Figure 5:
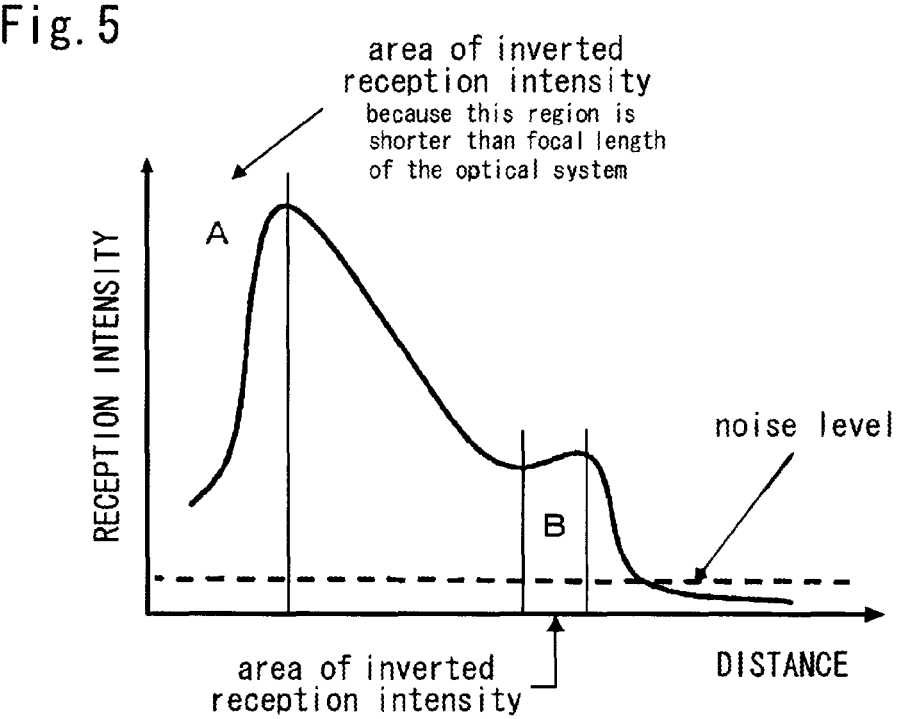
FIG. 5 explains an example in a case in which there exists a region in which the reception intensity of the LIDAR of Example 2 of the invention is inverted according to distance.

FIG. 5 explains an example in a case in which there exists a region in which the reception intensity of LIDAR is inverted according to distance. Normally the reception intensity of scattered light declines with distance, but the focal length of the optical system is set in the range from 2 km to infinity, and at close distances, efficient reception is not possible even at high scattered light intensity, so that the reception intensity declines. If this region is region A, then region A is specific to the device and is limited at close distances; hence even when there is inversion in region A, the inversion can be ignored.

On the other hand, regarding region B in which reception intensity is inverted far away, it is thought that matter which strongly scatters laser light is suspended. However, attenuation of the laser light due to the existence of this matter is also large, and so the entire region in which matter is suspended cannot be observed, and what can be observed is only the frontal part of this region, seen from the equipment itself.

When there is a portion in which the reception intensity is inverted in the distance direction, and moreover the reception intensity is equal to or above the noise level over the entire region, the frontal part of a region in which clouds, ice crystals or volcanic ash are suspended can be inferred. When identification of components of matter suspended in air is performed using the depolarization ratio described in Example 1 for only this region B, and danger for flight is detected, an alarm is issued automatically by voice, by an alarm light, or by a display on a flat panel. That is, by combining this reception intensity information and information obtained from depolarization ratio, performance in detecting components of matter suspended in air can be further enhanced, and the reliability of alarms can be improved.

Example 3

Figure 6:
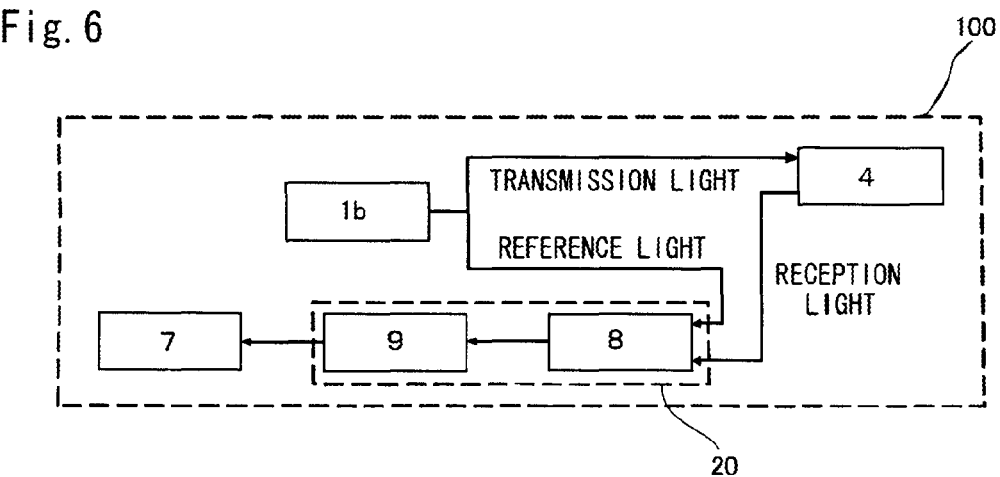
FIG. 6 is an explanatory diagram of the configuration of the LIDAR for detection of matter suspended in air of Example 3 of the invention.

FIG. 6 is an explanatory diagram of the configuration of the LIDAR for detection of matter suspended in air of Example 3. In this LIDAR for detection of matter suspended in air 100, the transmission side comprises a reference light source 1b which uses a laser diode or similar to generate laser light (reference light) which becomes transmitted light, and an optical telescope 4 which radiates the transmitted light output from the reference light source 1b to a great distance and which concentrates scattered light from a great distance. When Doppler LIDAR is used to detect air turbulence, it is necessary to observe light scattered by aerosols suspended in a high-altitude region extending at most several tens of kilometers in a remote region and at an altitude of 10 km or higher, and in order to detect wind velocity accompanying air turbulence with good precision, an optical amplifier must be used to increase the output of transmitted light; but when specializing for a function to detect the components of matter suspended in air such as ice crystals and volcanic ash which may endanger the flight of the aircraft, because it is assumed that the suspension density of ice crystals, volcanic ash and other matter suspended in air is sufficiently high compared with the suspension density of aerosols observed when measuring air turbulence, it is possible to detect ice crystals, volcanic ash and other components of matter suspended in air even when the optical amplifier and excitation light source are eliminated, or when using a low-gain optical amplifier, so that a low-cost device can be realized.

[Use Possibility in the Industry]

Doppler LIDAR for detection of air turbulence has the advantage of enabling measurement of air turbulence even in fair weather, and is expected to be useful for preventing accidents due to air turbulence, but due to high costs, cost-effectiveness is an obstacle to practical use. However, by applying the present invention to reinforce Doppler LIDAR functions, there is the advantageous result that aircraft accidents and damage to flight equipment due to ice crystals and volcanic ash can be prevented, and enhanced practical usefulness of Doppler LIDAR is anticipated.

[The explanation of the mark]

1, 1b: reference light source
2: optical amplifier
3: excitation light source
4: optical telescope
5: light receiver
6: signal processor
7: display
8: depolarization ratio measurement instrument
9: instrument to identify matter suspended in air
10: Doppler LIDAR unit
20: unit to detect suspended matter in air
30: received light separation means
31: reference light separation means
32: first optical receiver
33: second optical receiver
34: first signal processor
40: devices outside the airframe
41: fairing
42: window
50: devices inside the airframe
100: airborne lidar for detecting matter suspended in air
200: fuselage

What is claimed is:

1. A method of detecting matter suspended in air, in airborne Doppler LIDAR using laser light, the method comprising:
   remotely measuring a component of matter subjected to laser light reflection and scattering on a basis of the angular difference in planes of polarization of transmitted light which is laser light radiated into the atmosphere and received light scattered by matter suspended in air in a remote region, based on a correspondence relation between a depolarization ratio and components of matter suspended in air,
   wherein the measurement of the region of suspension of matter excludes an intensity region specific to a device based upon a focal length.

2. The method of detecting matter suspended in air according to claim 1, wherein laser light having a plane of polarization in one direction (an X-axis direction) is used as the transmitted light radiated into the atmosphere, and depolarization ratio $\delta$ of received light, which is an index indicating proportion of change of a polarization state of received light to that of transmitted light due to scattering by matter suspended in air, is expressed by the following equation:

$$\delta = |Ry|/|Rx|$$

where |Rx| is an intensity of the polarization component in the X-axis direction (parallel to the polarization direction of the transmitted light) of the received light R which has been scattered by matter suspended in air and returned to a transmission source, and |Ry| is an intensity of the polarization component in a Y-axis direction (perpendicular to the polarization direction of the transmitted light) of the received light R.

3. The method of detecting matter suspended in air according to claim 1, wherein a region of suspension of matter suspended in air is estimated from distant attenuation characteristic of a reception intensity of received light where the reception intensity of the received light does not attenuate with increasing measurement distance, and remote measurement of a component of the matter reflecting laser light is performed for the estimated suspension region.

4. The method of detecting matter suspended in air according to claim 2, wherein a region of suspension of matter suspended in air is estimated from the distant attenuation characteristics of the reception intensity of received light where the reception intensity of the received light does not attenuate with increasing measurement distance, and remote measurement of a component of the matter reflecting laser light is performed for the estimated suspension region.

5. A LIDAR device for detecting matter suspended in air, comprising:
   an optical telescope, which radiates (transmits) laser light into the atmosphere as transmitted light and which receives scattered laser light due to scattering of the laser light by aerosols in the atmosphere as received light;
   means for measuring depolarization ratio between the transmitted light and the received light; and
   means for detecting matter suspended in air, said means for detecting a component of matter suspended in air including ice crystals and volcanic ash on a basis of proportion of change in measured polarization states,
   wherein the measurement of the region of suspension of matter excludes an intensity region specific to the LIDAR device based upon a focal length.

6. The LIDAR device for detecting matter suspended in air according to claim 5, further comprising Doppler LIDAR means for, based on a Doppler shift between said transmitted light and said received light, measuring velocity of an air current in a remote region.

* * * * *